(12) United States Patent
Kurosawa

(10) Patent No.: US 7,456,547 B2
(45) Date of Patent: Nov. 25, 2008

(54) ULTRASONIC MOTOR

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 37 days.

(21) Appl. No.: 11/532,244

(22) Filed: Sep. 15, 2006

(65) Prior Publication Data

US 2007/0145859 A1    Jun. 28, 2007

(30) Foreign Application Priority Data

Sep. 16, 2005    (JP)    ............ P2005-269943

(51) Int. Cl.
    *H02N 2/00*    (2006.01)
(52) U.S. Cl. .............. 310/323.04; 310/323.13
(58) Field of Classification Search ............ 310/323.04, 310/323.13
    See application file for complete search history.

(56) References Cited

U.S. PATENT DOCUMENTS

| | | | | |
|---|---|---|---|---|
| 4,453,103 A | * | 6/1984 | Vishnevsky et al. | 310/323.02 |
| 4,580,073 A | * | 4/1986 | Okumura et al. | 310/323.04 |
| 5,233,257 A | * | 8/1993 | Luthier et al. | 310/323.08 |
| 5,357,489 A | * | 10/1994 | Luthier | 368/37 |
| 5,402,030 A | * | 3/1995 | Mukohjima | 310/323.04 |
| 6,198,202 B1 | * | 3/2001 | Tamai et al. | 310/323.15 |
| 6,856,072 B2 | | 2/2005 | Kosaka et al. | |
| 7,034,438 B2 | * | 4/2006 | Ohashi et al. | 310/323.13 |
| 7,245,061 B2 | * | 7/2007 | Mentesana | 310/323.09 |

FOREIGN PATENT DOCUMENTS

| JP | 4-67786 | * | 3/1992 |
|---|---|---|---|
| JP | 2002-058266 | | 2/2002 |

OTHER PUBLICATIONS

English Language Abstract of JP 2002-058266.
U.S. Appl. No. 11/470,744 to Korosawa, which was filed Sep. 7, 2006.
U.S. Appl. No. 11/549,996 to Korosawa, which was filed Oct. 17, 2006.

* cited by examiner

*Primary Examiner*—Thomas M Dougherty
(74) *Attorney, Agent, or Firm*—Greenblum & Bernstein, P.L.C.

(57) ABSTRACT

An ultrasonic motor is provided with a circular stator including a piezoelectric element and a comb teeth body with a multitude of comb teeth circumferentially aligned thereon, and a circular rotor supported by a rotating shaft and pressed against the comb teeth body, wherein the comb teeth respectively include, at least in a portion thereof press-contacting the rotor, a plurality of pin-shaped elements radially aligned at a predetermined interval. The pin-shaped element is elastically deformable in a radial direction at least in a tip portion thereof, and has a predetermined rigidity in a circumferential direction.

11 Claims, 10 Drawing Sheets

ULTRASONIC MOTOR

BACKGROUND OF THE INVENTION

The present invention relates to an ultrasonic motor, and more particularly to an ultrasonic motor with improved rotation efficiency with respect to amount of power supplied thereto.

An ultrasonic motor includes a stator on which a piezoelectric element polarized in a plurality of magnetic poles is circumferentially disposed, and a disk-shaped or ring-shaped rotor rotatably butted to the stator at a predetermined pressure, and is configured to apply a high frequency voltage to the piezoelectric element of the stator to cause the piezoelectric element to vibrate, and to circumferentially expand the vibration with the comb teeth body integrally provided with the piezoelectric element for circumferentially moving the comb teeth body in a traveling wave form, thus to cause the rotor, which is frictionally engaged with the piezoelectric element, to rotate around the shaft.

FIG. 11 is a cross-sectional view showing an example of a conventional ultrasonic motor, which includes a short cylindrical container-shaped comb teeth body 12 with a plurality of comb teeth 121 circumferentially aligned thereon, integrally attached to a lower face of a disk-shaped base 11, and a flat disk-shaped piezoelectric element 13 circumferentially polarized in a plurality of magnetic poles respectively corresponding to the comb teeth 121, integrally mounted on an upper face of the comb teeth body 12, and the piezoelectric element 13 and the comb teeth body 12 constitute the stator 1. To the piezoelectric element 13, a high frequency voltage is to be applied via a flexible substrate 14. In a shaft hole 112 at the center of the base 11 a cylindrical sleeve 15 is fixed, and inside the sleeve 15 a ball bearing 17 is enclosed, so as to pivotally support a rotating shaft 3. To the rotating shaft 3, a short cylindrical shaped rotor 2 is attached, such that an upper end face of a peripheral wall portion 21 is butted to each of the comb teeth 121 of the comb teeth body 12. Also, a compressed coil spring 16 is inserted in an axial direction between a lower end portion of the sleeve 15 and the ball bearing 17, so that the axial elastic force of the compressed coil spring 16 biases the ball bearing 17 and the rotating shaft 3, thus to press the rotor 2 to the comb teeth 121 of the stator 1.

In this ultrasonic motor, when a high frequency voltage is applied to the piezoelectric element 13 via the flexible substrate 14, the piezoelectric element 13 vibrates, and hence the comb teeth body 12 integrally mounted therewith vibrates, to thereby circumferentially displace the comb teeth 121 which are circumferentially aligned. Accordingly, the peripheral wall portion 21 of the rotor 2 butted to the comb teeth 121 is equally moved circumferentially by the frictional force, so that the rotor 2 and the rotating shaft 3 integrally attached thereto are caused to rotate.

Thus, the rotor 2 is butted to the stator 1 at a predetermined pressure, and under such structure the rotor 2 has to be evenly pressed against the stator 1 in order to efficiently convert the vibration of the comb teeth body 12 of the stator 1 into the rotating motion of the rotor 1. For such purpose, the press-contact surfaces, via which the peripheral wall portion 21 of the rotor 2 and the comb teeth 12 of the stator 1 are butted with pressure, have to be processed at a precision of a level of several micrometers, and also the precision in assembly has to be upgraded so that the press-contact surfaces of the peripheral wall portion 21 and the comb teeth 121 may achieve a close contact. In an actual manufacturing process of the ultrasonic motor, however, it is practically difficult to satisfy such requirements, and hence a conversion loss into the rotating motion of the rotor 2 is inevitably incurred, thus resulting in failure in achieving an ultrasonic motor that provides higher rotation efficiency. It may be technically possible to upgrade the surface accuracy, however in this case the processing cost becomes significantly higher, which naturally leads to an increase in manufacturing cost of the ultrasonic motor.

Japanese Patent Provisional Publication No. P2002-58266A (hereinafter, referred to as '266 publication) adopts comb teeth of the stator that are elastically deformable in a rotation direction of the rotor. The technique according to '266 publication allows transmitting the vibration of the comb teeth to the rotor with the comb teeth closely pressed against the rotor because of the elastic deformation that takes place in the rotation direction of the rotor, which prevents a slipping motion between the stator and the rotor, thus effectively improving the rotation efficiency.

The technique according to '266 publication of elastically deforming the comb teeth of the stator in the rotation direction of the rotor is, however, not applicable to the ultrasonic motor as shown in FIG. 11, in which the comb teeth are circumferentially displaced to transmit the rotational force to the rotor. Even when the technique according to '266 publication is somehow applicable, the press-contact between the comb teeth and the rotor inevitably becomes uneven when the surface accuracy in a radial direction of the comb teeth and the rotor is insufficient, because the comb teeth are not designed to be elastically deformed radially. Consequently, the rotation efficiency cannot be improved as desired.

SUMMARY OF THE INVENTION

Aspects of the invention provide an ultrasonic motor in which a stator and a rotor are more closely butted to each other so as to achieve higher rotation efficiency of the rotor.

The present invention provides an ultrasonic motor comprising a circular stator including a piezoelectric element and a comb teeth body with a multitude of comb teeth circumferentially aligned thereon, and a circular rotor supported by a rotating shaft and pressed against the comb teeth body, wherein the comb teeth respectively include, at least in a portion thereof press-contacting the rotor, a plurality of pin-shaped elements (i.e., the plurality of comb teeth aligned in the radial direction of the stator) radially aligned at a predetermined interval. The pin-shaped element is elastically deformable in a radial direction at least in a tip portion thereof, and has a predetermined rigidity in a circumferential direction.

The pin-shaped elements may, for example, be formed in a plate shape formed such that a cross-section perpendicular to an axial direction of the rotating shaft has a longer side in a circumferential direction and a shorter side in a radial direction. Further, the pin-shaped elements may be formed in a plate shape formed such that a cross-section perpendicular to an axial direction of the rotating shaft has a longer side in a circumferential direction and a shorter side in a radial direction, and is of a trapezoidal shape with a shorter radially inner side than a radially outer side. Also, each of the pin-shaped elements is formed in an independent plate shape, and the base portion of the pin-shaped elements is integrally formed with the comb teeth body, while the tip portion is pressed against the rotor.

BRIEF DESCRIPTION OF THE ACCOMPANYING DRAWINGS

DETAILED DESCRIPTION OF THE EMBODIMENTS

Figure 1:
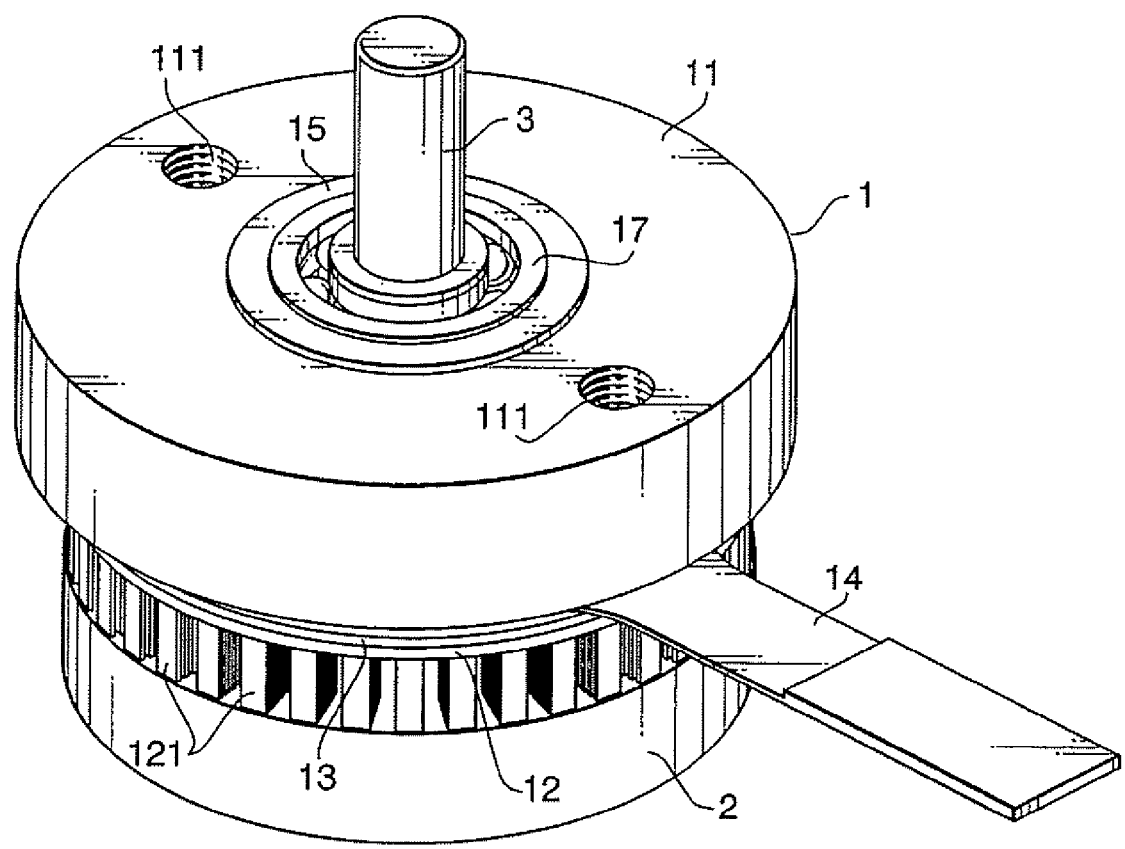
FIG. 1 is a perspective view showing an appearance of an ultrasonic motor according to an embodiment.
Figure 2:
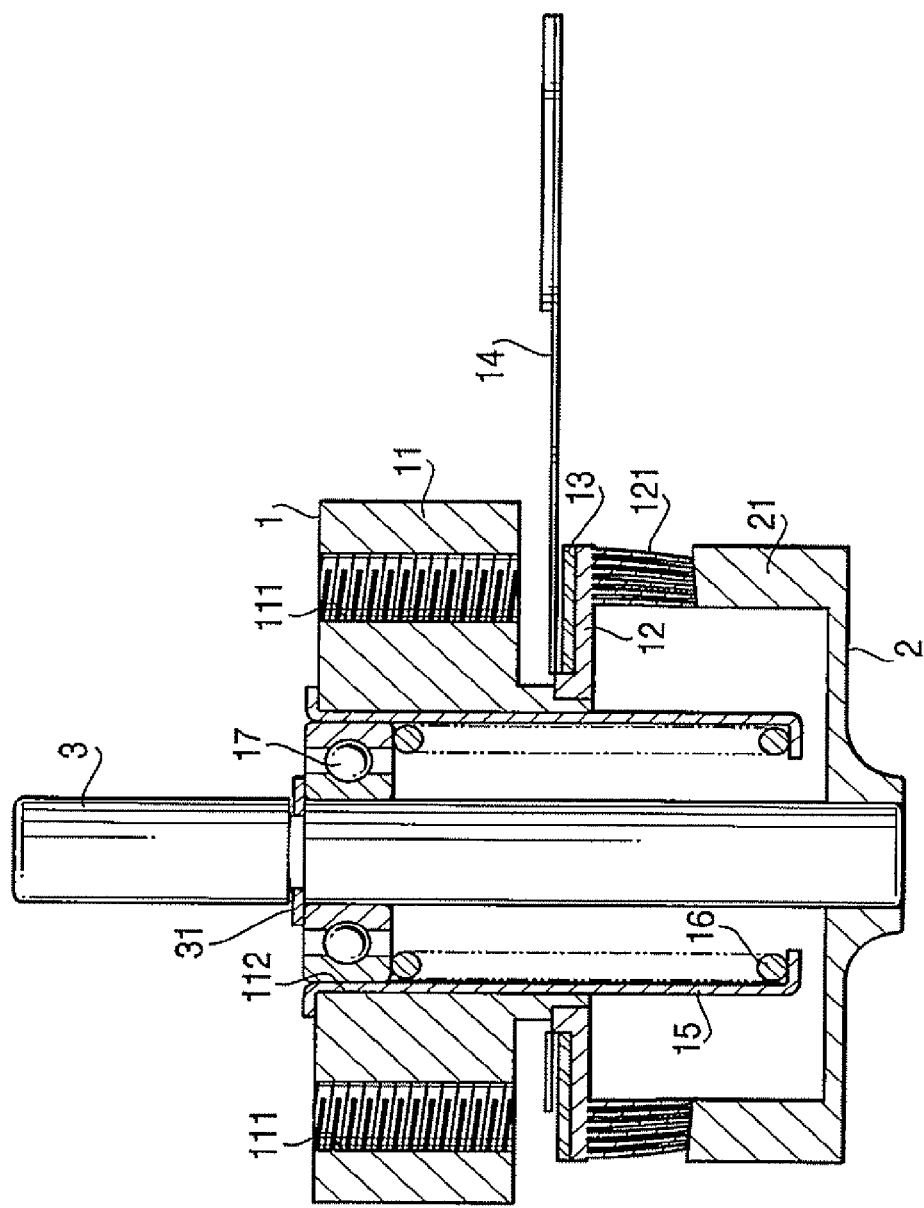
FIG. 2 is a cross-sectional view of the ultrasonic motor shown in FIG. 1, taken in an axial direction.
Figure 3:
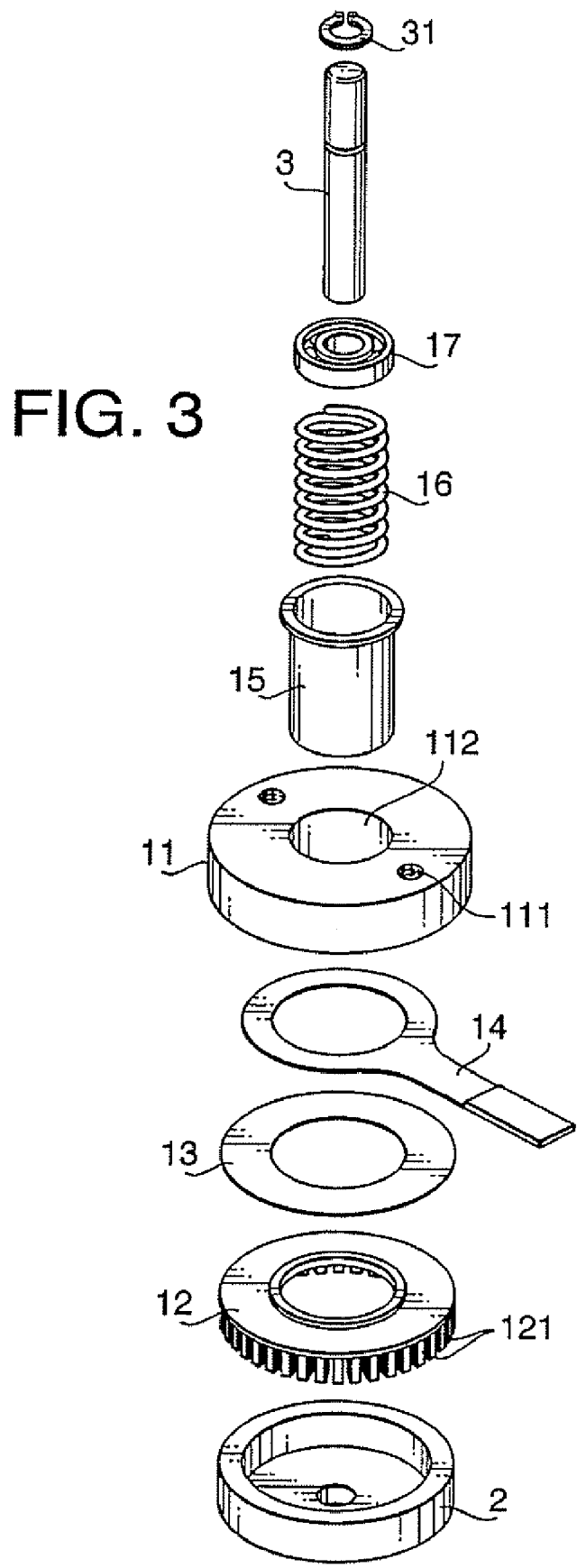
FIG. 3 is an exploded perspective view of a part of the ultrasonic motor shown in FIG. 1.

Hereunder, an embodiment of the present invention will be described referring to the drawings. FIG. 1 is a perspective view showing an appearance of an ultrasonic motor according to a first embodiment, FIG. 2 is a vertical cross-sectional view of the ultrasonic motor shown in FIG. 1, and FIG. 3 is an exploded perspective view of a part of the ultrasonic motor. In these drawings, a short cylindrical container-shaped comb teeth body 12 with a plurality of comb teeth 121 circumferentially aligned thereon is integrally attached to a lower face of a disk-shaped base 11 with a mounting hole 111 for the motor, and a flat disk-shaped piezoelectric element 13, circumferentially polarized in a plurality of magnetic poles respectively corresponding to the comb teeth 121, is integrally mounted on an upper face of the comb teeth body 12, and the piezoelectric element 13 and the comb teeth body 12 constitute the stator 1. To the piezoelectric element 13, a high frequency voltage is to be applied via a flexible substrate 14. At the center of the base 11 a shaft hole 112 is provided, in which a cylindrical sleeve 15 is fixed along the inner circumferential surface thereof. Inside the sleeve 15 a ball bearing 17 is enclosed, so as to pivotally support a rotating shaft 3, and a washer 31 is provided for detaining the rotating shaft 3. To the rotating shaft 37 a short cylindrical shaped rotor 2 is attached, such that an upper end face of a peripheral wall portion 21 is butted to each of the comb teeth 121 of the comb teeth body 12. Also, a compressed coil spring 16 is inserted in an axial direction between a lower end portion of the sleeve 15 and the ball bearing 17, so that the axial elastic force of the compressed coil spring 16 biases the ball bearing 17 and the supporting rotating shaft 3 upward, thus to press the rotor 2 to the comb teeth 121 of the stator 1.

Figure 4:
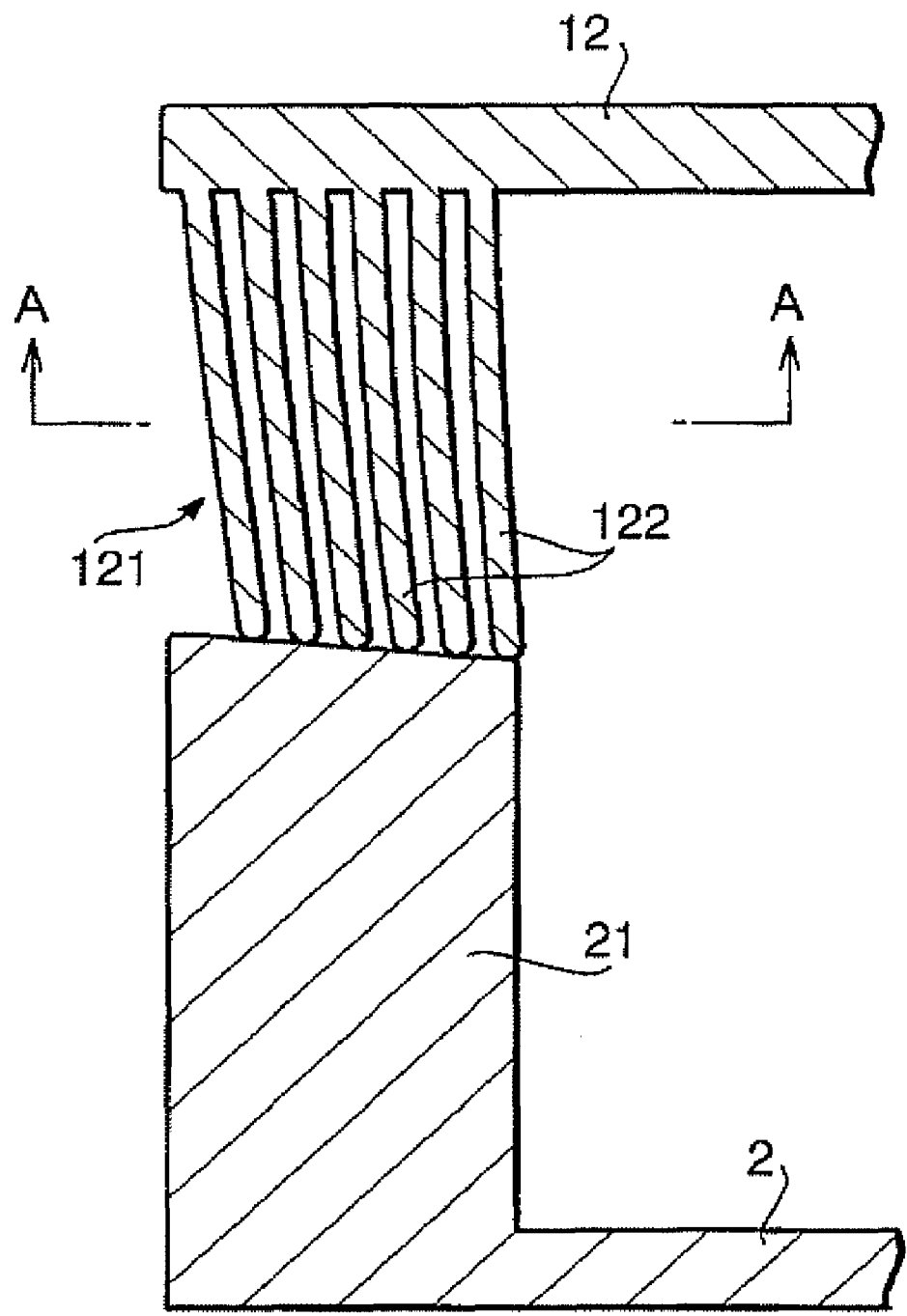
FIG. 4 is an enlarged cross-sectional view showing a press-contacting portion between a comb tooth and a rotor.
Figure 5:
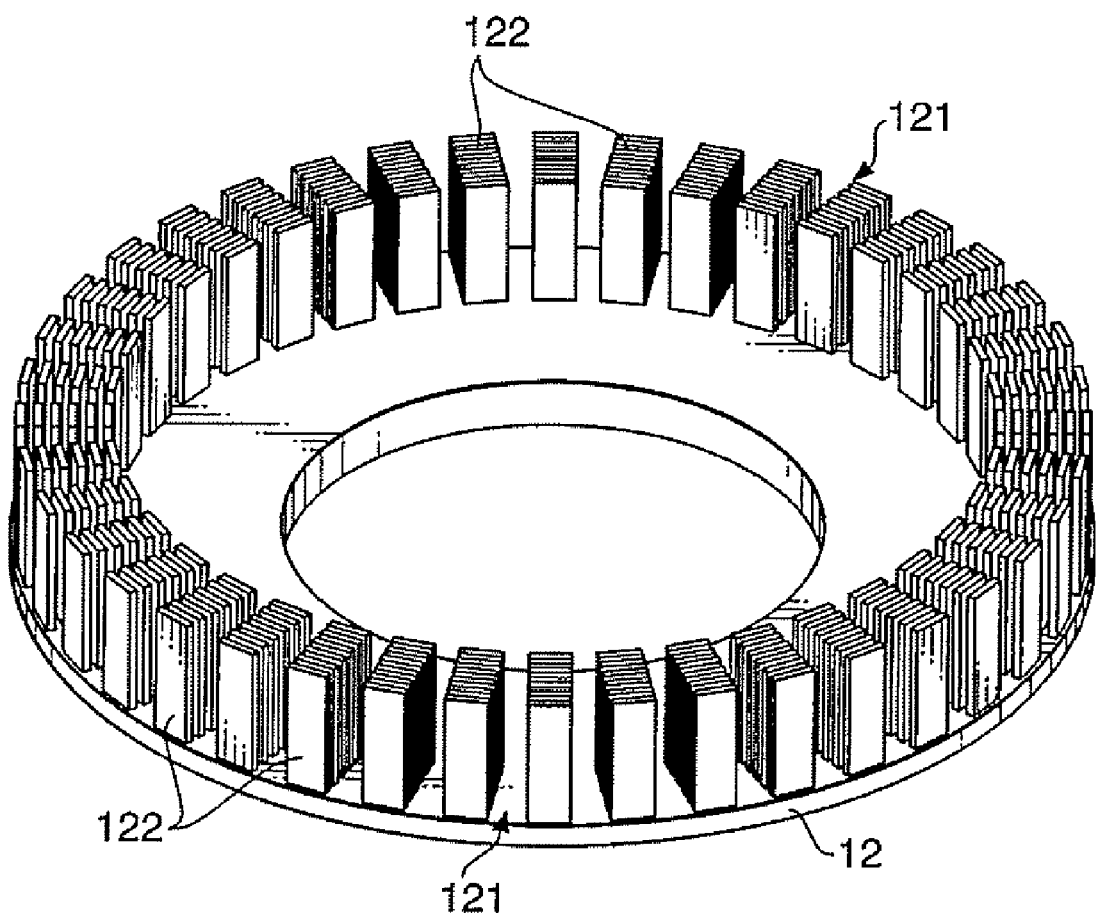
FIG. 5 is a perspective view showing a comb teeth body turned over.

FIG. 4 is an enlarged cross-sectional view showing a press-contacting state between the comb teeth body 12 and the rotor 2, and FIG. 5 is a perspective view showing the comb teeth body 12 turned over. The multitude of comb teeth 121 located along the circumference of the comb teeth body 12 respectively include a plurality, specifically six pieces herein, of pin-shaped elements 122 radially aligned with a fine gap. As is apparent from FIG. 6A which is a cross-sectional view taken along the line A-A in FIG. 4, and FIG. 6B which is a perspective view showing one of the pin-shaped elements 122, the pin-shaped elements 122 are of a rectangular thin plate shape, in which a tip portion 122a has an arcuate cross-section in an axial direction of the rotating shaft, and are aligned at a predetermined interval in the thicknesswise direction, i.e. radially of the comb teeth body 12. The pin-shaped elements 122 are connected to the comb teeth body 12 at the respective base portion 122b, thus constituting an integral structure with the comb teeth body 12. Also, the plate thickness and the arcuate shape of the tip portion of the pin-shaped elements 122 are designed such that a total of the area, via which the tip portions 122a of the radially aligned six pin-shaped elements contact the press-contact surface of the peripheral wall portion 21 of the rotor 2, creates a frictional force of a predetermined magnitude against the peripheral wall portion 21 of the rotor 2. Further, the plate thickness and circumferential length of the pin-shaped elements 122 are designed so as to allow the tip portion 122a to be elastically deformed with respect to the base portion 122b in the thicknesswise direction, i.e., radially of the comb teeth body 12, while securing a predetermined rigidity in a circumferential direction.

The comb teeth body 12 integrally including the pin-shaped elements 122 constituting the comb teeth 121 is made of a resin-based compound containing a resin of a thermal deformation temperature of 200° C. or higher, such as PPS or nylon, and an abrasion-resistant material such as a potassium titanate whisker, and integrally formed with the pin-shaped elements by injection molding, for example. Otherwise, the pin-shaped elements constituting the comb teeth 121 may be made of a metal such as iron, a stainless steel, phosphor bronze or brass, with a low-friction and abrasion-resistant surface treatment such as non-electrolytic Ni—P plating, and coupled by an adhesive or welding to the comb teeth body 12 formed in a disk shape from a metal such as iron, a stainless steel, phosphor bronze or brass, or a resin such as ABS or PC.

In the ultrasonic motor according to the embodiment 1, when a high frequency voltage is applied to the piezoelectric element 13 via the flexible substrate 14, the piezoelectric element 13 vibrates, and hence the comb teeth body 12 integrally mounted thereon vibrates, to thereby circumferentially displace the plurality of comb teeth 121 which are circumferentially aligned, i.e. each group of the six pieces of pin-shaped elements 122. Since the peripheral wall portion 21 of the rotor 2 is pressed by the spring force of the compressed coil spring 16 against the tip portion 122a of the respective pin-shaped elements 122, i.e. to the press-contact surface, the peripheral wall portion 21 of the rotor 2 is circumferentially moved by the frictional force created on the press-contact surfaces of the peripheral wall portion 21 of the rotor 2 and the pin-shaped elements 122, so that the rotor 2 and the rotating shaft 3 integrally attached thereto are caused to rotate. The rotational force of the rotating shaft 3 is transmitted to an external apparatus via a gear (not shown) attached to the rotation shaft 3.

At this moment, as stated earlier, although the press-contact surfaces of the peripheral wall portion 21 of the rotor 2 and the comb teeth 121 (pin-shaped elements 122) of the stator 1 are designed to create a predetermined frictional force, the desired frictional force cannot be achieved when the press-contact surfaces are not in sufficiently close contact because of poor surface accuracy of those press-contact surfaces. According to the embodiment 1, however, when the peripheral wall portion 21 of the rotor 2 is pressed against the press-contact surface of the comb teeth 121, the pin-shaped elements 122 constituting the comb teeth 121 are elastically deformed in a thicknesswise direction, i.e. in a radial direction as shown in FIG. 4, thereby allowing the tip portion 122a of each pin-shaped element 122 to be securely pressed against the press-contact surface of the peripheral wall portion 21 of the rotor 2, even when the surface accuracy of the press-contact surface of the peripheral wall portion of the rotor is insufficient. In this case, according to the structure shown in FIG. 4, the press-contact surface of the peripheral wall portion 21 is formed in a conical plane inclined upward in a radially outer direction with respect to a plane perpendicular to the rotating shaft, and therefore the tip portion 122a of the respective pin-shaped elements 122 can be elastically deformed equally, in a radially inner direction. Accordingly, the pin-shaped elements 122 are kept from mutually interfering, such that some of the pin-shaped elements are elastically deformed in a radially outer direction, to thereby disturb the achievement of the desired press-contact state. As a result, the foregoing structure enables constantly maintaining the press-contact surfaces of the respective groups of the six pin-shaped elements 122, i.e. the comb teeth 121 and the peripheral wall portion 21 of the rotor 2 pressed against each other via the designed contact area, thus achieving the predetermined frictional force to be created therebetween. Also, though the pin-shaped elements 122 are elastically deformed in a radial direction, a predetermined rigidity of the pin-shaped elements 122 is secured in a circumferential direction, which assures transmission without any loss of the rotational force created when the comb teeth body 12 vibrates by the circumferential displacement of the comb teeth 121 respectively constituted of the six pin-shaped elements 122, to the rotor 2. Thus, the rotation efficiency of the rotor 2 can be improved.

Figure 6A:
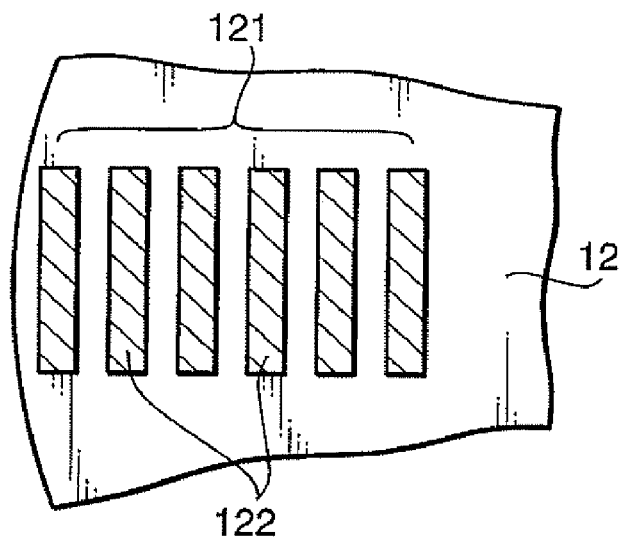
FIG. 6A is a cross-sectional view of the comb teeth according to a first embodiment taken along the line A-A in FIG. 4.
Figure 6B:
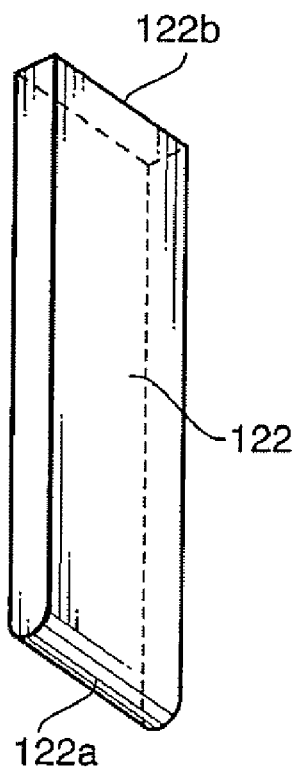
FIG. 6B is a perspective view showing a pin-shaped element according to the same embodiment.
Figure 7A:
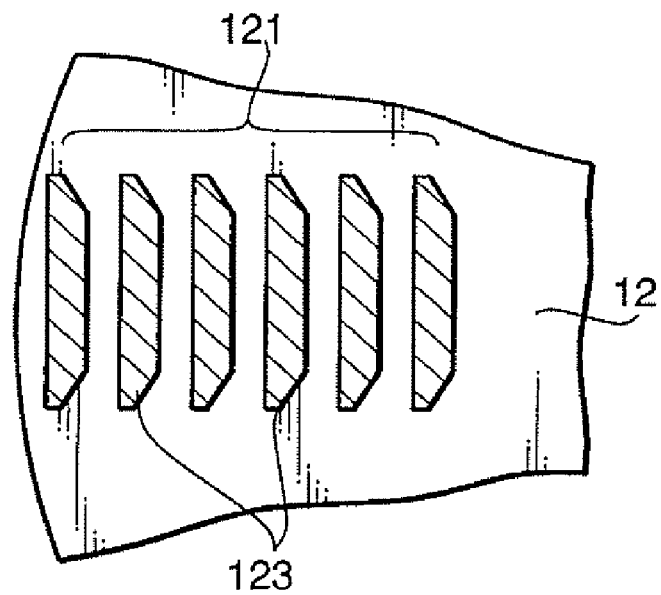
FIG. 7A is a cross-sectional view of the comb teeth according to a second embodiment taken along the line A-A in FIG. 4.
Figure 7B:
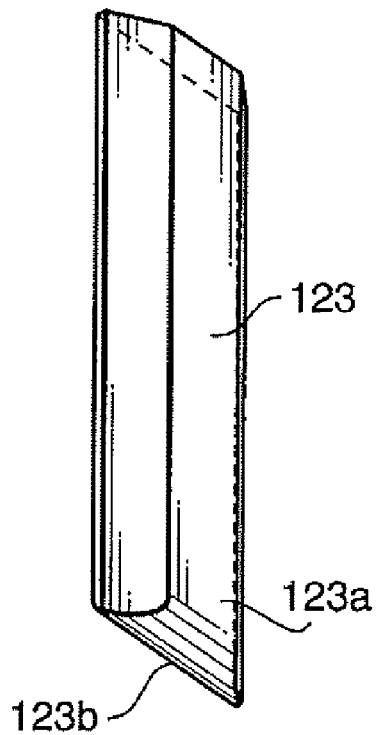
FIG. 7B is a perspective view showing a pin-shaped element according to the same embodiment.

FIGS. 7A and 7B depict the comb teeth according to a second embodiment, from the same angle as FIGS. 6A and 6B respectively. In the embodiment 2, the pin-shaped elements 123 are formed such that a cross-section perpendicular to the shaft becomes a trapezoid. Specifically, the radially inner side 123a of the pin-shaped element 123 is made shorter than the radially outer side 123b, thus forming a trapezoid. Such configuration further facilitates the pin-shaped elements 123 to be elastically deformed toward the radially inner side 123a which is shorter, when elastically deformed in the thicknesswise direction, thereby allowing the pin-shaped elements to be equally elastically deformed toward the shorter side, i.e. in a radially inner direction, even when the press-contact surface of the peripheral wall portion 21 of the rotor 2 is horizontally formed perpendicular to the axial direction of the rotating shaft, instead of upwardly inclining in a radially outer direction as in the embodiment 1 shown in FIG. 4.

Figure 8:
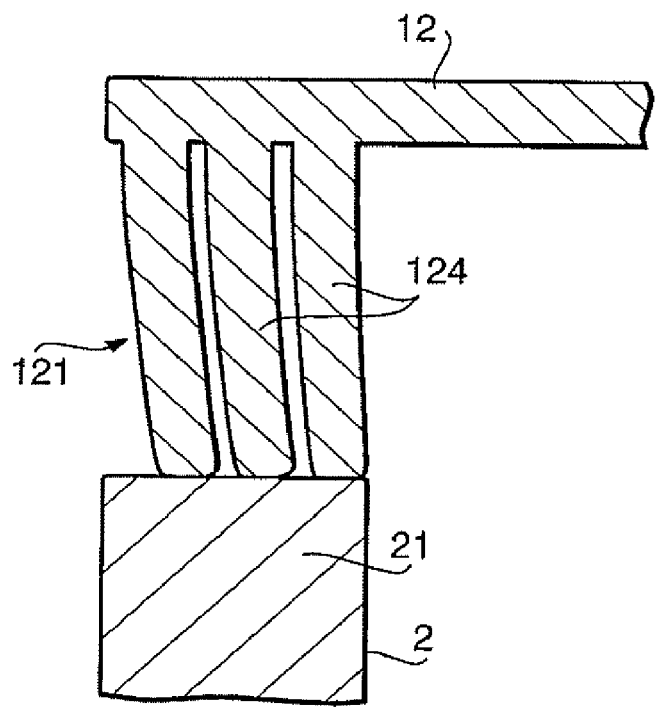
FIG. 8 is a cross-sectional view of a first variation of the pin-shaped elements.

The number of pin-shaped elements constituting the respective comb teeth 121 of the comb teeth body 12 is not limited to six as in the embodiments, but may be determined as desired. For example as shown in FIG. 8, the comb teeth 121 may be constituted of three pin-shaped elements 124. The number of pin-shaped elements may be appropriately determined according to such factors as the frictional force required between the comb teeth and the rotor, radial dimension of the ultrasonic motor, and the shape, dimensions and further the elastic force of the pin-shaped elements.

Figure 9:
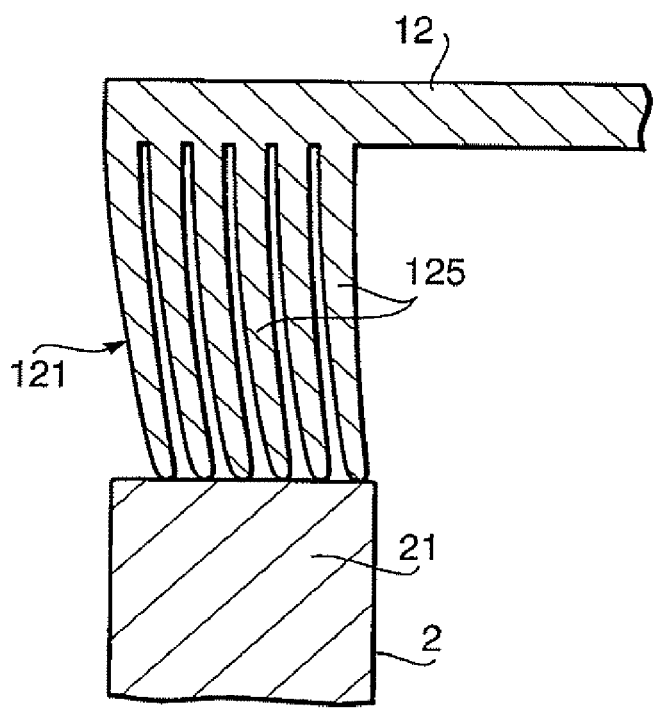
FIG. 9 is a cross-sectional view of a second variation of the pin-shaped elements.
Figure 10:
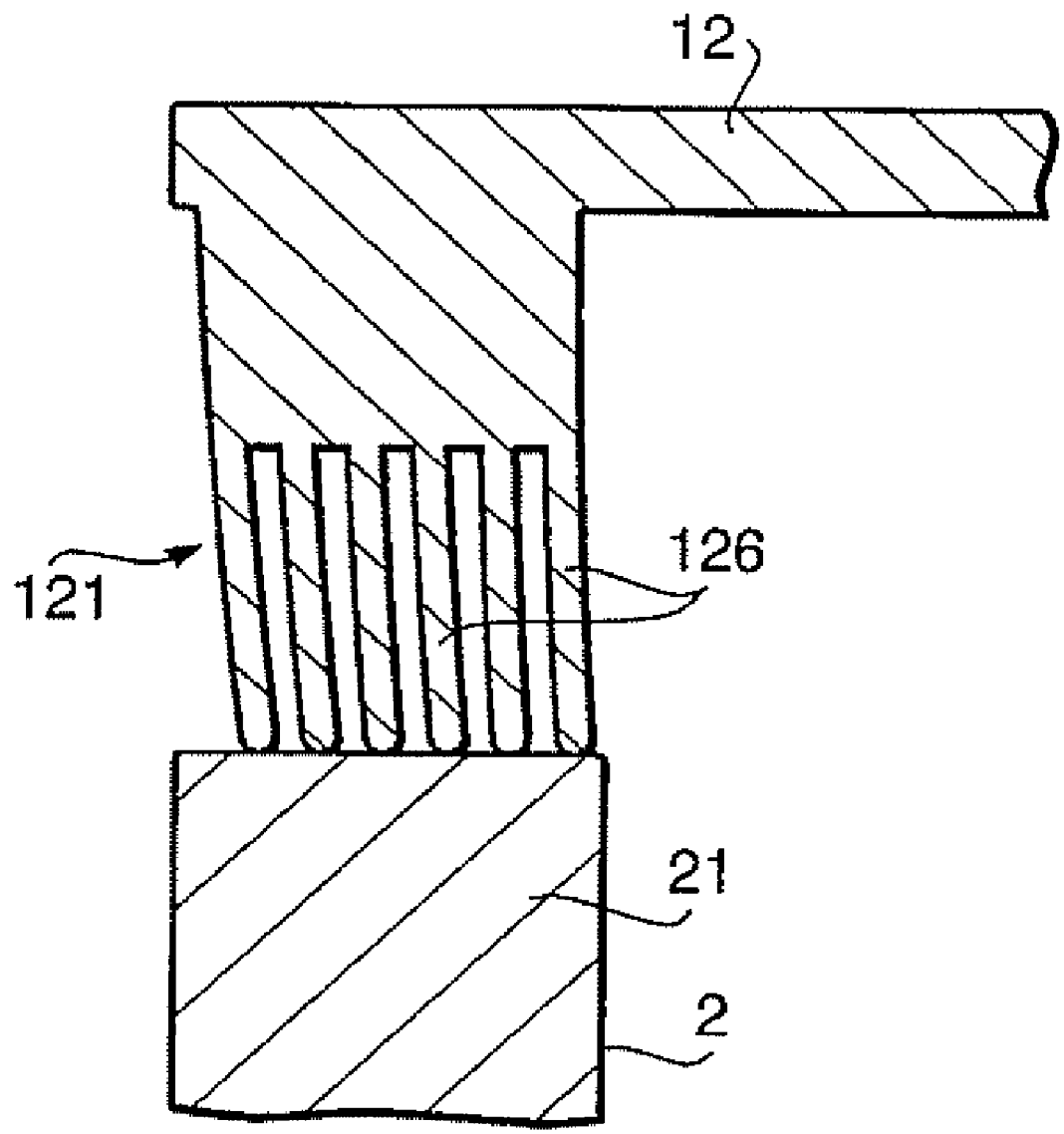
FIG. 10 is a cross-sectional view of a third variation of the pin-shaped elements.
Figure 11:
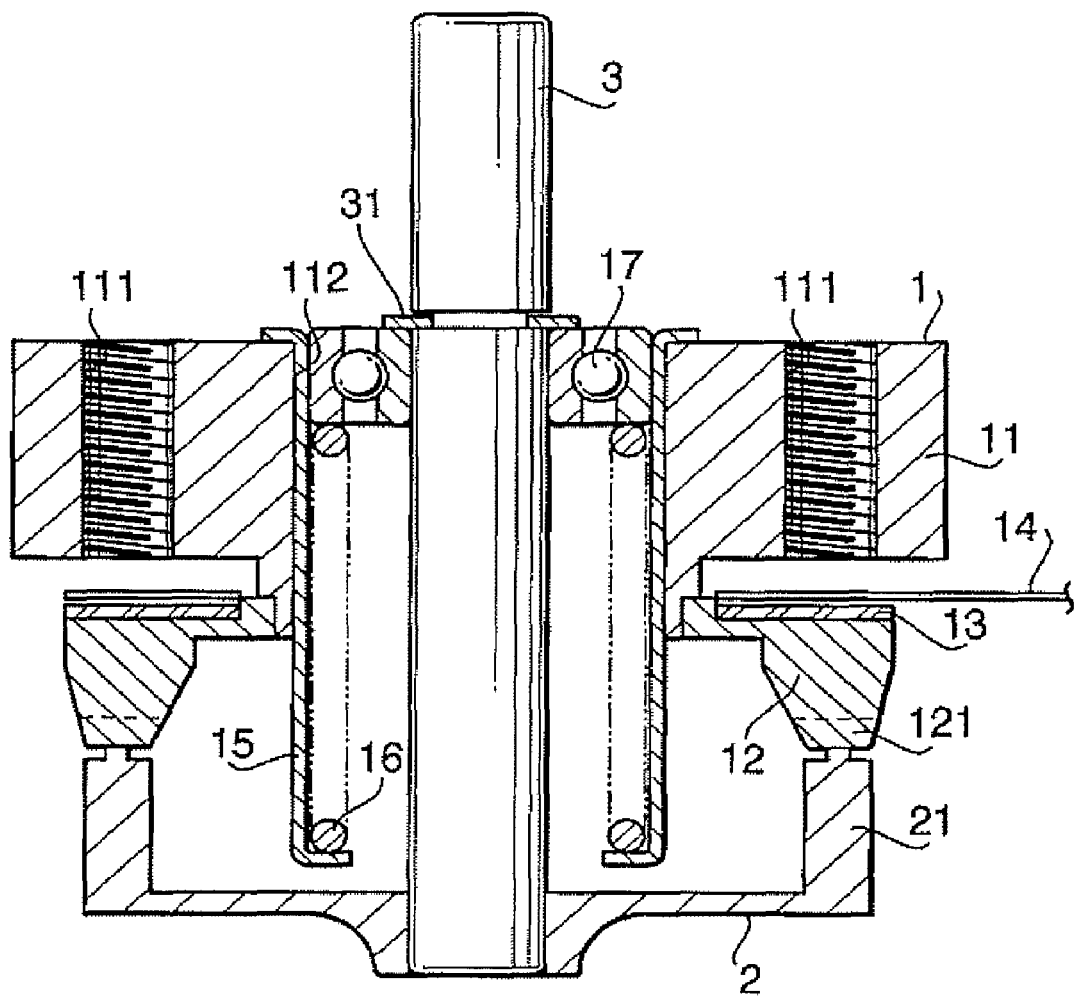
FIG. 11 is a cross-sectional view of a conventional ultrasonic motor.

Also, as shown in FIG. 9, each pin-shaped element 125 may be formed so as to be thicker in a portion closer to the base than in a portion closer to the tip, to reduce the amount of the elastic deformation in a radial direction. Alternatively as shown in FIG. 10, the comb teeth may be split into a plate shape only halfway from the tip portion, thus to form pin-shaped elements 126, which are still elastically deformable radially, instead of splitting all the way from the tip portion to the base portion to form the independent plates. In this case also, the pin-shaped elements 126 may be formed in a tapered shape such that a portion closer to the base is thicker than a portion closer to the tip.

According to the above-described illustrative embodiments, when the rotor is pressed against the comb teeth, the pin-shaped elements constituting the comb teeth are elastically deformed in a thicknesswise direction, i.e. in a radial direction, so that the tip portion of each pin-shaped element is securely pressed against the rotor, to thereby maintain the frictional force between the rotor and the comb teeth at a predetermined level, which results in higher transmission efficiency of the vibration of the stator to the rotor for creating the rotational force. Such structure, therefore, allows improving the rotation efficiency of the rotor, without the need to upgrade the surface accuracy of the rotor and the stator.

The present disclosure relates to the subject matter contained in Japanese Patent Application No. 2005-269943, filed on Sep. 16, 2005, which is expressly incorporated herein by reference in its entirety.

What is claimed is:

1. An ultrasonic motor, comprising:
   a circular stator comprising a piezoelectric element and a comb teeth body, the comb teeth body having a plurality of comb teeth aligned in both a circumferential direction and a radial direction of the stator, wherein the plurality of comb teeth aligned in the radial direction is spaced at predetermined intervals so as to extend from a periphery of the comb teeth body towards a center of the comb teeth body; and
   a circular rotor supported by a rotating shaft and pressed against the comb teeth body so as to contact at least a portion of the comb teeth aligned in the radial direction.

2. The ultrasonic motor according to claim 1, wherein the plurality of comb teeth is elastically deformable, at least in a tip portion thereof, in the radial direction, and wherein the plurality of comb teeth have a predetermined rigidity in a circumferential direction.

3. The ultrasonic motor according to claim 2, wherein the plurality of comb teeth comprises a plate shape provided such that a cross-section perpendicular to an axial direction of the rotating shaft has a side extending in the circumferential direction which is longer than a side extending in the radial direction.

4. The ultrasonic motor according to claim 2, wherein the plurality of comb teeth comprises a plate shape provided such that a cross-section perpendicular to an axial direction of the rotating shaft has a side extending in the circumferential direction which is longer than a side extending in the radial direction, and wherein the cross-section is of a trapezoidal shape so as to have a radially inner side which is shorter than a radially outer side.

5. The ultrasonic motor according to claim 1, wherein each of the plurality of comb teeth comprises a separate plate shape, wherein a base portion of each of the plurality of comb teeth is formed integral with the comb teeth body, and wherein a tip portion of each of the plurality of comb teeth is configured to be pressed against the rotor.

6. The ultrasonic motor according to claim 1, wherein the circular rotor further comprises an inclined surface configured to pressingly contact at least a portion of the plurality of comb teeth.

7. The ultrasonic motor according to claim 1, wherein a thickness of a base portion connecting each of the plurality of teeth to the comb teeth body is thicker than a thickness of a tip portion of each of the plurality of teeth.

8. The ultrasonic motor according to claim 1, wherein the plurality of comb teeth is defined by recesses provided between adjacent comb teeth, wherein the recesses extend approximately half a distance from a tip portion of each of the plurality of teeth to a planar surface of the rotor.

9. The ultrasonic motor according to claim 2, wherein the circular rotor further comprises an inclined surface configured to pressingly contact at least a portion of the plurality of comb teeth.

10. The ultrasonic motor according to claim 2, wherein a thickness of a base portion connecting each of the plurality of teeth to the comb teeth body is thicker than a thickness of a tip portion of each of the plurality of teeth.

11. The ultrasonic motor according to claim 2, wherein the plurality of comb teeth is defined by recesses provided between adjacent comb teeth, wherein the recesses extend approximately half a distance from a tip portion of each of the plurality of teeth to a planar surface of the rotor.

* * * * *